United States Patent
Yu et al.

(10) Patent No.: US 11,695,591 B2
(45) Date of Patent: Jul. 4, 2023

(54) IN-BAND MANAGEMENT INTERFACE WITH USER SPACE DATAPATH

(71) Applicant: Nicira, Inc., Palo Alto, CA (US)

(72) Inventors: Jia Yu, Sunnyvale, CA (US); Yong Wang, Sunnyvale, CA (US); Xinhua Hong, Milpitas, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 17/521,593

(22) Filed: Nov. 8, 2021

(65) Prior Publication Data

US 2022/0060355 A1 Feb. 24, 2022

Related U.S. Application Data

(63) Continuation of application No. 16/786,897, filed on Feb. 10, 2020, now Pat. No. 11,201,762, which is a
(Continued)

(51) Int. Cl.
*G06F 15/16* (2006.01)
*H04L 12/46* (2006.01)
(Continued)

(52) U.S. Cl.
CPC .......... *H04L 12/4654* (2013.01); *H04L 12/66* (2013.01); *H04L 41/0654* (2013.01); *H04L 41/0806* (2013.01); *H04L 41/145* (2013.01); *H04L 43/0817* (2013.01); *H04L 45/02* (2013.01); *H04L 45/122* (2013.01); *H04L 45/306* (2013.01); *H04L 45/42* (2013.01); *H04L 45/44* (2013.01); *H04L 45/586* (2013.01); *H04L 45/64* (2013.01); *H04L 45/72* (2013.01); *H04L 45/74* (2013.01); *H04L 45/745* (2013.01); *H04L 47/19* (2013.01); *H04L 49/25* (2013.01); *H04L 49/3009* (2013.01); *H04L 49/3063* (2013.01); *H04L 49/354* (2013.01); *H04L 49/9068* (2013.01); *H04L 61/2585* (2013.01);
(Continued)

(58) Field of Classification Search
None
See application file for complete search history.

(56) References Cited

U.S. PATENT DOCUMENTS 9,979,677 B2 5/2018 Zhang et al.
10,587,434 B2 3/2020 Yu et al.
(Continued)

*Primary Examiner* — Wing F Chan
*Assistant Examiner* — Andrew Woo
(74) *Attorney, Agent, or Firm* — Adeli LLP

(57) ABSTRACT

A method of utilizing the same hardware network interface card (NIC) in a gateway of a datacenter to communicate datacenter tenant packet traffic and packet traffic for a set of applications that execute in the user space of the gateway and utilize a network stack in the kernel space of the gateway. The method sends and receives packets for the datacenter tenant packet traffic through a packet datapath in the user space. The method sends incoming packets from the NIC to the set of applications through the datapath in the user space, a user-kernel transport driver connecting the kernel network stack to the datapath in the user space, and the kernel network stack. The method receives outgoing packets at the NIC from the set of applications through the kernel network stack, the user-kernel transport driver, and the data path in the user space.

20 Claims, 14 Drawing Sheets

Related U.S. Application Data continuation of application No. 15/650,693, filed on Jul. 14, 2017, now Pat. No. 10,587,434.

(51) Int. Cl.

| | |
|---|---|
| *H04L 12/66* | (2006.01) |
| *H04L 41/0654* | (2022.01) |
| *H04L 41/14* | (2022.01) |
| *H04L 45/02* | (2022.01) |
| *H04L 45/122* | (2022.01) |
| *H04L 45/302* | (2022.01) |
| *H04L 45/42* | (2022.01) |
| *H04L 45/44* | (2022.01) |
| *H04L 45/586* | (2022.01) |
| *H04L 45/64* | (2022.01) |
| *H04L 45/00* | (2022.01) |
| *H04L 45/74* | (2022.01) |
| *H04L 45/745* | (2022.01) |
| *H04L 47/19* | (2022.01) |
| *H04L 49/25* | (2022.01) |
| *H04L 49/00* | (2022.01) |
| *H04L 49/354* | (2022.01) |
| *H04L 49/90* | (2022.01) |
| *H04L 61/2585* | (2022.01) |
| *H04L 67/1038* | (2022.01) |
| *H04L 69/321* | (2022.01) |
| *H04L 69/326* | (2022.01) |
| *H04L 69/329* | (2022.01) |
| *H04L 41/0806* | (2022.01) |
| *H04L 43/0817* | (2022.01) |
| *H04L 69/322* | (2022.01) |
| *H04L 69/16* | (2022.01) |
| *H04L 67/63* | (2022.01) |
| *H04L 67/568* | (2022.01) |
| *H04L 67/1001* | (2022.01) |
| *H04L 43/08* | (2022.01) |
| *H04L 43/106* | (2022.01) |
| *H04L 61/103* | (2022.01) |
| *H04L 61/2503* | (2022.01) |
| *H04L 67/1095* | (2022.01) |
| *H04L 61/5014* | (2022.01) |
| *H04L 101/622* | (2022.01) |
| *H04L 101/663* | (2022.01) |

(52) U.S. Cl.
CPC ...... *H04L 67/1001* (2022.05); *H04L 67/1038* (2013.01); *H04L 67/568* (2022.05); *H04L 67/63* (2022.05); *H04L 69/16* (2013.01); *H04L 69/321* (2013.01); *H04L 69/322* (2013.01); *H04L 69/326* (2013.01); *H04L 69/329* (2013.01); *H04L 43/08* (2013.01); *H04L 43/106* (2013.01); *H04L 45/22* (2013.01); *H04L 45/38* (2013.01); *H04L 61/103* (2013.01); *H04L 61/2503* (2013.01); *H04L 61/5014* (2022.05); *H04L 67/1095* (2013.01); *H04L 2101/622* (2022.05); *H04L 2101/663* (2022.05)

(56) References Cited

U.S. PATENT DOCUMENTS

2012/0324442 A1\* 12/2012 Barde ............... G06F 9/45558
718/1
2016/0226960 A1   8/2016 Zhang et al.
2019/0020501 A1   1/2019 Yu et al.
2020/0186390 A1   6/2020 Yu et al.

\* cited by examiner

IN-BAND MANAGEMENT INTERFACE WITH USER SPACE DATAPATH

CLAIM OF BENEFIT TO PRIOR APPLICATIONS

This application is a continuation application of U.S. patent application Ser. No. 16/786,897, filed Feb. 10, 2020, now published as U.S. Patent Publication 2020/0186390. U.S. patent application Ser. No. 16/786,897 is a continuation application of U.S. patent application Ser. No. 15/650,693, filed Jul. 14, 2017, now issued as U.S. Pat. No. 10,587,434. U.S. patent application Ser. No. 16/786,897, now published as U.S. Patent Publication 2020/0186390, and U.S. patent application Ser. No. 15/650,693, now issued as U.S. Pat. No. 10,587,434, are hereby incorporated by reference.

BACKGROUND

Traditional network packet processing requires packets to traverse kernel space and then to user space applications. Due to overhead in kernel space such as system calls and TCP/IP stack, a high performance user space I/O pipeline can be utilized where a network interface card (NIC) directly receives and transmits packets to/from user space without requiring the packets to traverse the kernel space.

One limitation of such a user space I/O pipeline is that the user space owns the NIC. For management applications that rely on TCP/IP stack, a separate dedicated NIC has to be assigned for sending and receiving the packets that has to go through the TCP/IP stack in the kernel space. This requirement adds cost due to additional NIC hardware, additional switch ports, and the complexity of managing the additional hardware.

BRIEF SUMMARY

Some embodiments provide an in-band management interface, where management traffic and user space network I/O share the same network interface card (NIC). Different embodiments provide different solutions to support the in-band management interface. Some embodiments provide the in-band management interface by using a user-kernel transport driver. Other embodiments use SR-IOV to provide NIC bifurcation Some embodiments provide a method of utilizing the same hardware network interface card (NIC) in a gateway to communicate datacenter tenant packet traffic and packet traffic for a set of applications that execute in the user space of the gateway. The set of applications utilize a network, stack such as the TCP/IP stack, in the kernel space of the gateway to communicate packets. The method sends and receives packets for the datacenter tenant packet traffic through a packet datapath in the user space of the gateway.

The method sends the incoming packets from the NIC to the set of applications through a pipeline that includes a datapath in the user space, a user-kernel transport driver that connects the kernel network stack to the datapath in the user space, and the kernel network stack. The method receives outgoing packets at the NIC from the set of applications through the kernel network stack, the user-kernel transport driver, and the datapath in the user space. The user-kernel transport driver in some embodiments is kernel NIC interface (KNI).

Some embodiments provide a method of communicating packet traffic by an SR-IOV enabled NIC of a gateway. The SR-IOV provides a physical function (PF) and a set of virtual functions (VFs) for the NIC. The method at the PF of the NIC, communicates packets for a set of tenants of the datacenter through a packet datapath in the user space of the gateway. The method at one of the VFs of the NIC, communicates packets between the NIC and a set of applications that execute in the user space of the gateway through the VF, a kernel VF driver, and a kernel network stack in a kernel space of the gateway.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
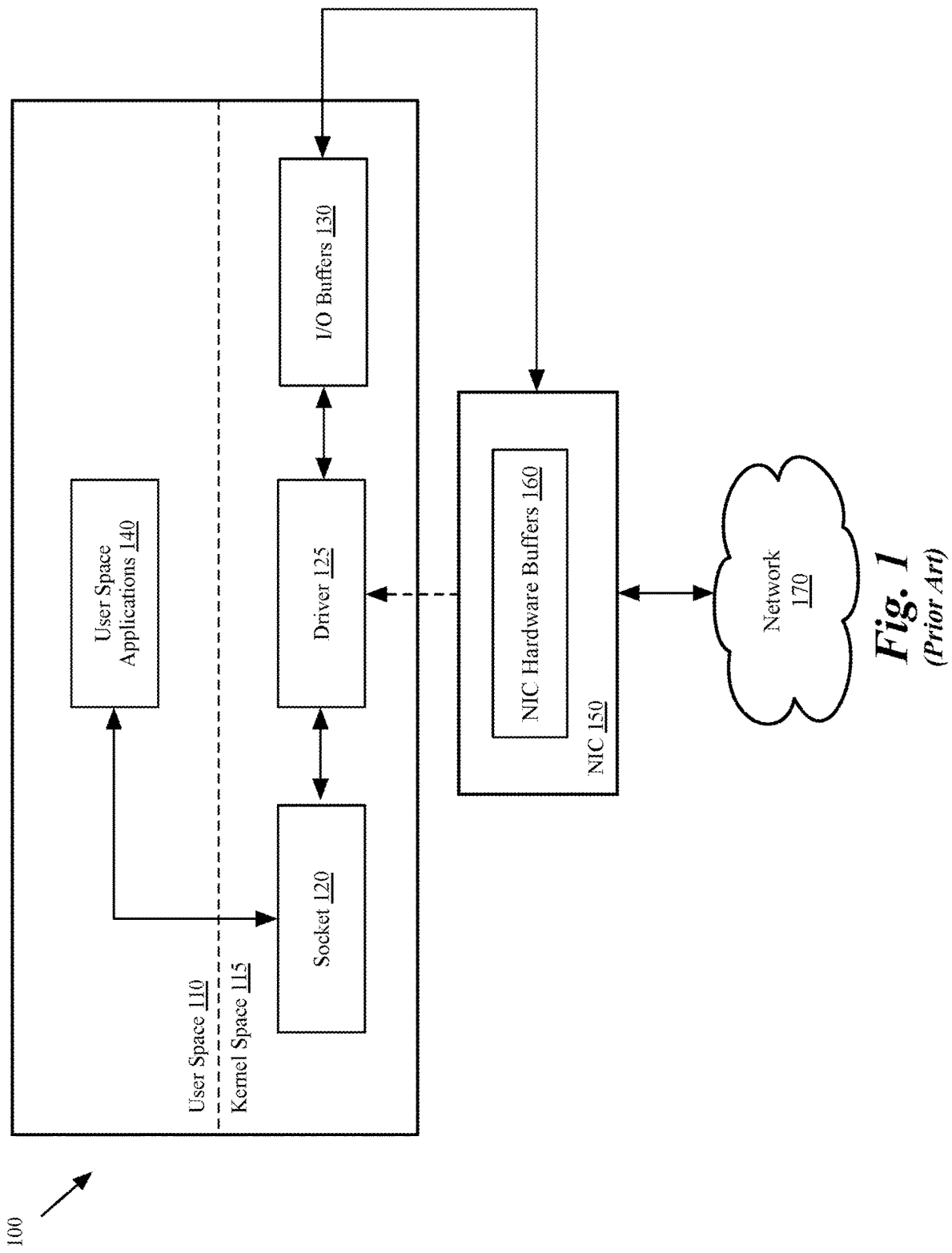
FIG. 1 illustrates a packet processing pipeline for a gateway according to prior art.

Traditional network packet processing requires packets to traverse kernel space to/from a user space application. FIG. 1 illustrates a packet processing pipeline for a gateway according to prior art. Some operating systems, such as Linux, divide memory space into user space and kernel space. The kernel space is reserved for running a privileged operating system kernel, kernel extensions, and most device drivers. In contrast, user space is a memory area where application software and some device drivers execute.

As shown, the memory space of the gateway 100 is divided into user space 110 and kernel space 115. The gateway also includes a network interface card (NIC) 150. The NIC 150 is a hardware (or physical) NIC (PNIC). The NIC 150 includes hardware circuitry that connects that gateway 100 to a network 170. In order to send and receive packets from the network interface card (NIC) 150, a user space application 140 in the user space 110 binds to a socket 120 (e.g., a transport control protocol/Internet protocol (TCP/IP) socket) in the kernel space 115.

The NIC driver 125 maintains a set of input/output (I/O) buffers 130 such as first in, first out (FIFO) ring buffers that point to data structures in kernel that hold packet data. The NIC driver 125 sends/receives packets to/from the NIC 150. The NIC has a set of hardware buffers 160 to store packets and communicates the packets with the network 170. As shown, the NIC 150 indirectly sends and receives packets to/from the user space application 140 through the kernel space 115.

Due to overhead in kernel space such as system calls (e.g., for user space to kernel space memory conversion), TCP/IP stack, etc., Linux and data plane development kit (DPDK) community advocated user space I/O for attaining high performance, where the NIC directly receives and transmits packets to/from the user space.

Figure 2:
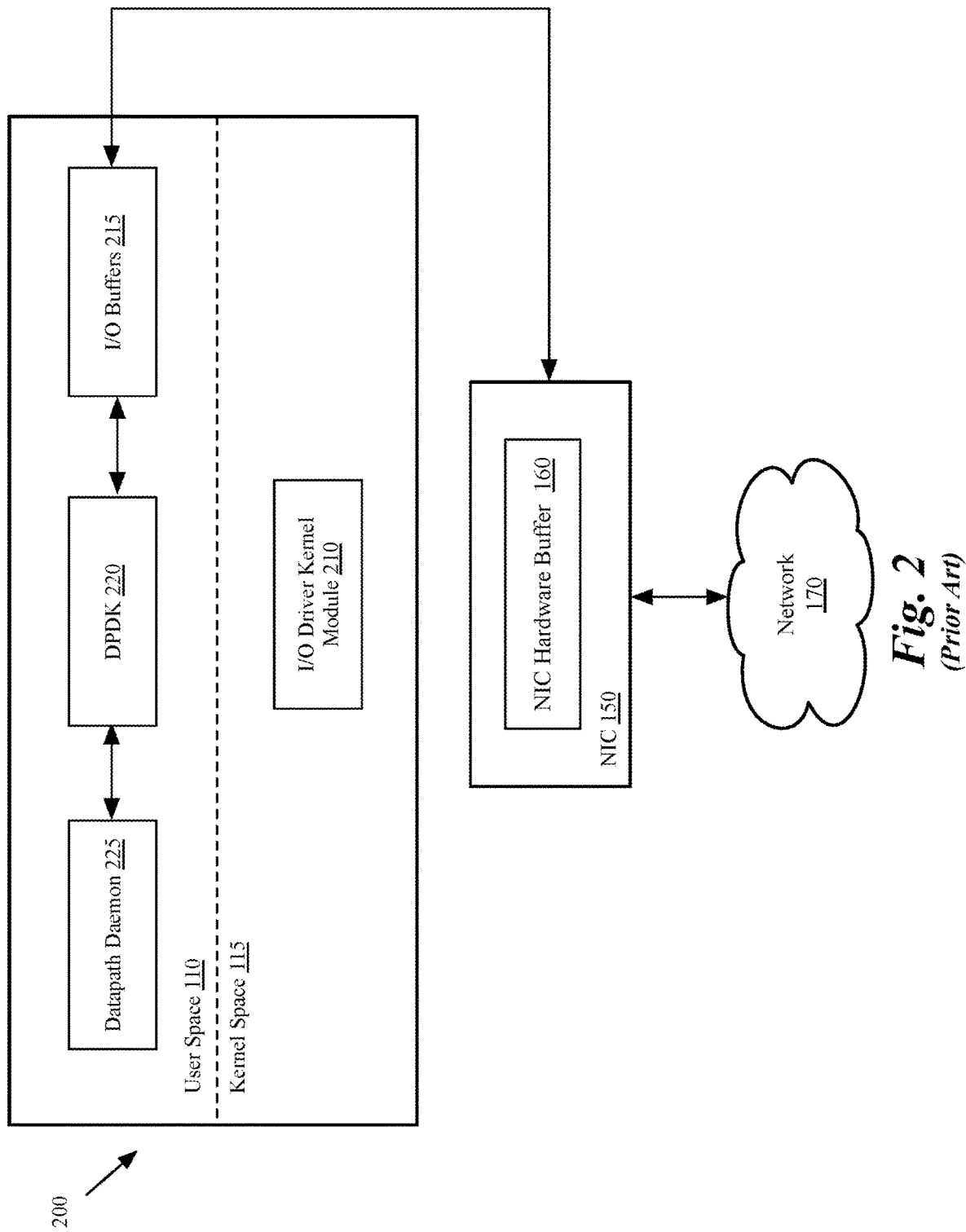
FIG. 2 illustrates a user space packet processing pipeline for a gateway according to prior art.

FIG. 2 illustrates a user space packet processing pipeline for a gateway according to prior art. DPDK 220 is a set of libraries and drivers that provide a framework for development of packet networking applications in user space 110. Datapath daemon 225 provides services such as routing, switching, virtual private network (VPN), etc. For instance, the datapath daemon 225 provides networking layer (Open Systems Interconnection (OSI) L3 (layer 3)) forwarding and services in logical networks.

As shown, the I/O buffers 215 (e.g., ring buffers) are in the user space 110 and point to data structures in the user space that hold packet data. The I/O driver kernel module 210 provides resource mapping from the kernel space to the user space. The I/O driver kernel module 210 provides direct memory access (DMA) into the user space 110 and allows the NIC 150 to be managed from the user space 110, bypassing the kernel space 115. Packet data is transferred from the user space 110 to the NIC 150 without going through the kernel space 115.

One limitation of the user space I/O is that the datapath daemon 225 completely owns the NIC device 150. There are, however, user space applications that are not DPDK aware. For instance, the applications in the management interface that are used to manage guest virtual machines (VMs) on a host in a data center are not DPDK aware. A VM is a software implementation of a machine such as a computer. The management interface provides applications and services to monitor the state of VMs and the host on which the VMs are running, control (e.g., power on, suspend, resume, reset, and power off) the VMs on a host, connect an administrator console to a VM for the VM management, view details about each VM (e.g., system summary, hardware information, connected users, a log of recent events), secure console and management interface sessions, etc.

Examples of these applications include user space secure shell (ssh), dynamic host configuration protocol (DHCP) client, user space management plane agent communicating with the management plane, control plane agent communicating with the control plane, etc. These user space applications rely on TCP/IP stack in kernel space for packet communication.

For the user space applications that are not DPDK aware, a separate dedicated NIC has to be assigned. If link redundancy is required, a minimum of two additional NICs is needed to create link aggregation bond for management traffic. The use of the additional NICs adds cost due to additional NIC hardware and switch ports, and creates complexity managing them. This model is referred to herein as out-band management traffic and is for user space applications that are not DPDK aware.

Figure 3:
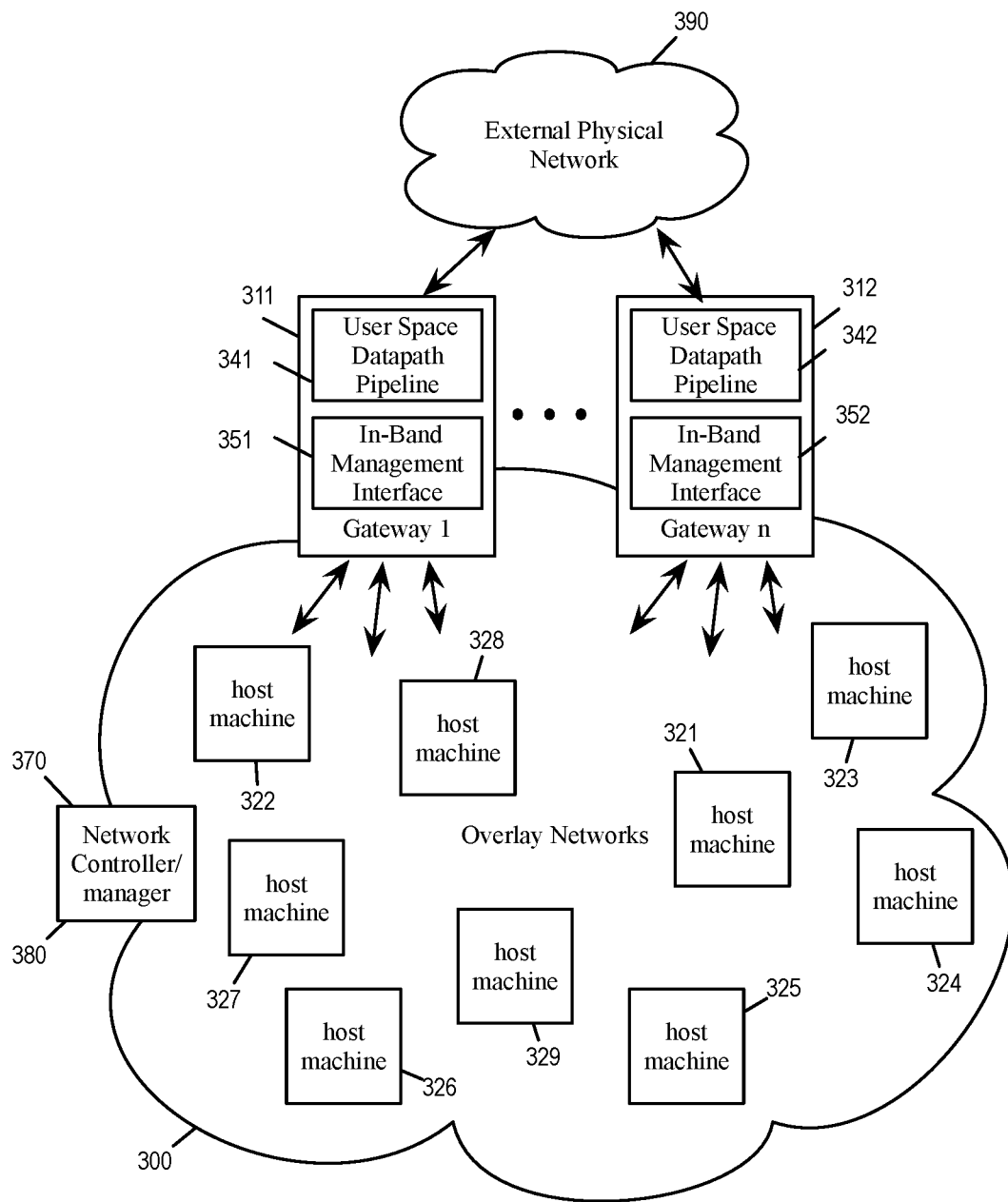
FIG. 3 conceptually illustrates a data center whose traffic to and from an external network goes through a set of gateways.

Some embodiments provide an in-band management interface for user space applications that are not DPDK aware. In these embodiments, management traffic and user space network I/O share the same NICs. FIG. 3 conceptually illustrates a data center 300 whose traffic to and from an external network 390 goes through gateways 311-312. Each of the gateways operates a user space datapath pipeline (341 and 342 respectively) for processing packets that go through the gateway. Each user space datapath pipeline 341-342 includes an in-band management interface (351 and 352 respectively), which allows DPDK aware user space applications and user space applications that are not DPDK aware to share the same NIC through the corresponding user space datapath pipelines 341-342.

The datacenter 300 includes other computing and networking resources 321-329 that are interlinked by a provider network. These resources communicate with each other through a provider network and with the external network 390 by network traffic over physical communication mediums (which can include wired communications such as Ethernet or wireless communications such as WiFi). Packets from the computing and networking resources 321-329 can reach the external network 390 through one of the gateways 311-312, and packets from the external network 390 can reach the computing and network resources 321-329 through one of the gateways 311-312. A gateway of a network is therefore regarded as being at the edge of the network and therefore also referred to as an edge device or edge node.

In some embodiments, some of these resources are provided by computing devices serving as host machines 321-329. Some of these host machines operate virtualization software, which allow these host machines to host various virtual machines (VMs). In some embodiments, a gateway is itself a host machine, and user space datapath pipelines (341 or 342) of the gateway is provided by one of the VMs running on its virtualization software. Some of these resources are running as "bare metal", i.e., without virtualization software. In some embodiments, the gateway is a bare metal computing device that operates its datapath pipeline directly over its own operating system without virtualization software.

In some embodiments, the packet traffic within the datacenter is conducted by using overlay logical networks such as Virtual eXtensible LAN (VXLAN), Generic Network Virtualization Encapsulation (GENEVE), and Network Virtualization using Generic Routing Encapsulation (NVGRE). In some of these embodiments, each of the host machines and the gateway machines is a VXLAN endpoint (referred to as VTEP) that transmits packets using overlay encapsulation. In some embodiments, the external physical network is conducted by VLAN, and the gateways relay the traffic between the datacenter and the external network by translating VXLAN packets to VLAN packets and vice versa.

In some embodiments, the computing and networking resources of the datacenter implement one or more logical networks, each logical network having access to the gateways 311-312 for traffic to and from the external network 390. In some embodiments, each logical network has its own set of logical routers and logical switches for conducting network traffic of the logical network. Some or all of these logical routers and switches are provided by software operating in the host machines (either as virtualization software or as programs executing on bare metal host machines). In some embodiments, some of the logical routers and switches operate in the gateways 311-312 as stages in their respective datapath pipelines 341-342.

In some embodiments, the datacenter 300 includes a network manager 380 for provisioning or creating the logical networks in the data center 300 and a network controller 370 (or a cluster of controller) for controlling the various logical routers and switches (including those operating in the gateways 311-312) of the various logical networks.

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) to a set of physical machines using a set of logical forwarding elements (e.g., logical layer 2 (L2) and L3 switches). In some embodiments, different subsets of end machines reside on different host machines that execute managed forwarding elements (MFEs). The MFEs implement the logical forwarding elements of the logical network to which the local end machines are logically connected. These MFEs may be flow-based forwarding elements (e.g., Open vSwitch), code-based forwarding elements, or a combination of the two, in various different embodiments. These different types of forwarding elements implement the various logical forwarding elements differently, but in each case they execute a pipeline for each logical forwarding element that may be required to process a packet.

In the virtualization field, some refer to software switches as virtual switches as these are software elements. However, in this specification, the software forwarding elements are referred to as MFEs, in order to distinguish them from logical forwarding elements (LFEs), which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

Some embodiments provide support for in-band interface for applications that are not DPDK aware. In these embodiments, traffic that uses the network stack in the kernel and the user space network traffic share the same NICs. In some embodiments, the in-band traffic interface is provided by utilizing user space kernel transport. In other embodiments, the interface is provided by utilizing flow bifurcation to split traffic between the user space and kernel space.

I. In-Band Management Interface Using User Space Kernel Transport

Figure 4:
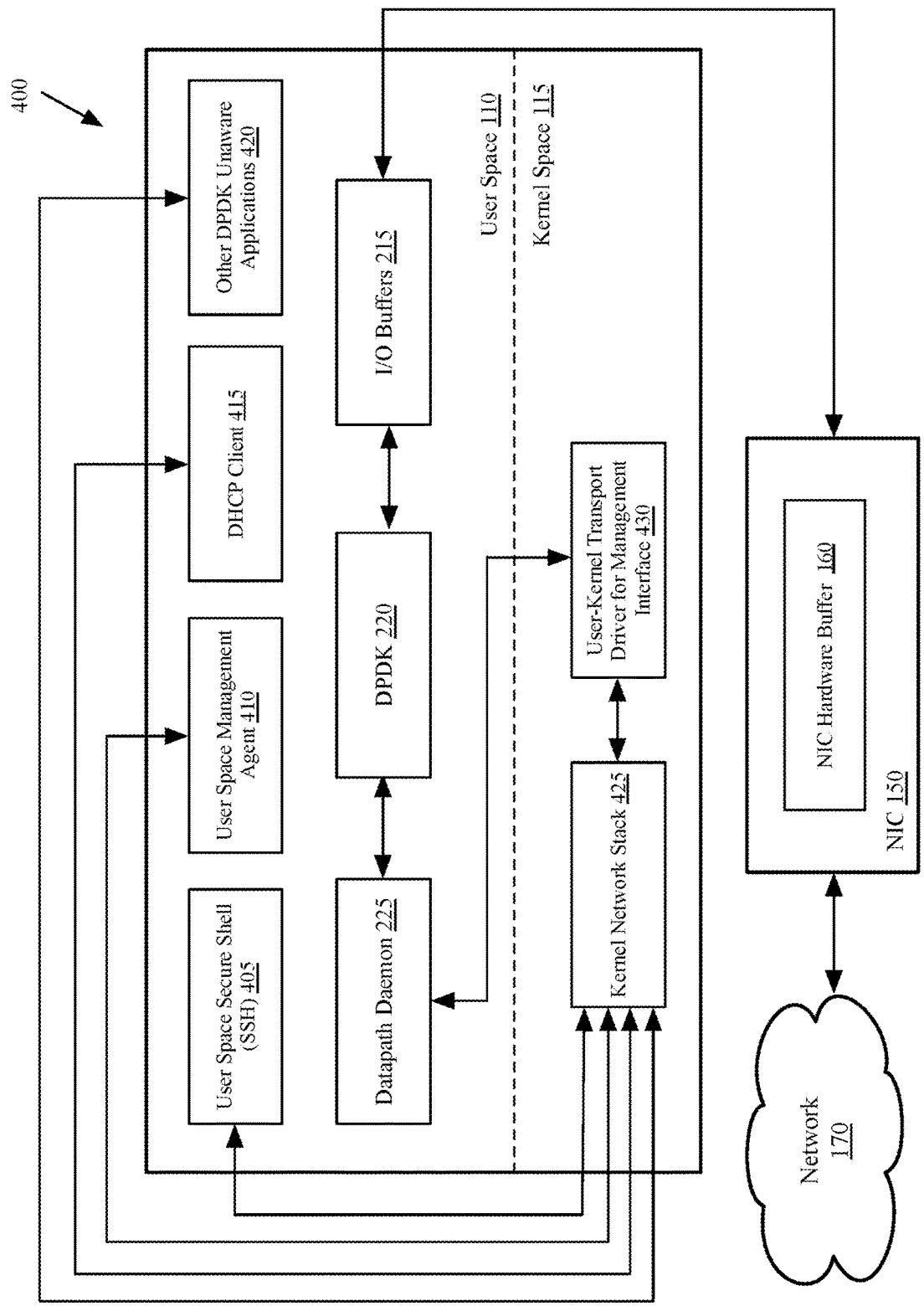
FIG. 4 conceptually illustrates a user space packet processing pipeline that shares the same NIC between the management traffic and user space DPDK aware traffic in some embodiments.

Some embodiments provide in-band management interface by utilizing a user-kernel data transport mechanism such as KNI (Kernel NIC Interface). KNI allows user space application access to the kernel space. KNI also provides an interface with the kernel network stack. FIG. 4 conceptually illustrates a user space packet processing pipeline that shares the same NIC between management traffic and user space DPDK aware traffic in some embodiments. As shown, the user space 110 includes a datapath pipeline that includes the datapath daemon 225, DPDK 220 libraries and drivers, and I/O buffers 215.

The gateway 400 in some embodiments sends and receives packets for a logical network that includes a set of logical entities that make a data path for forwarding the packets to their destinations. DPDK 220 is a set of libraries and drivers that provide a framework for development of packet networking applications in user space 110. Datapath daemon 225 provides services such as routing, switching, VPN, etc.

The user space 110 also includes applications 405-420 that are not DPDK aware and cannot directly use the datapath pipeline to send and receive packets to/from the network through the NIC 150. As shown, applications 405-420 require the use of a kernel network stack 425 (such as TCP/IP stack) to send and receive packets.

Examples of these applications include user space ssh 405 used to remotely log into a user space application, DHCP client 415 used to provide an IP host with its IP address and other configuration information such as the subnet mask and default gateway, and user space management plane agent 410 used to communicate with the management plane.

Other DPDK unaware applications 420 include control plane agent used to communicate with the control plane servers, applications and services that monitor the state of VMs and the hosts, applications that control (e.g., power on, suspend, resume, reset, and power off) the VMs on a host, applications for connecting an administrator console to a VM, applications that provide information regarding each VM (e.g., system summary, hardware information, connected users, a log of recent events), secure console and management interface sessions, etc. These user space applications rely on TCP/IP stack in kernel space for packet communication.

In some embodiments, the operating system of the gateway machine provides the kernel network protocol stack 425 as a processing thread in its kernel space. Such a network stack is normally used to handle network protocols for packets at the NIC 150 of the gateway machine 400.

As shown, the user space applications 405-420 use kernel network stack 425 for communicating packets, and ending and receiving packets through the kernel network stack 425 (e.g., the TCP/IP stack in the kernel space 115). The gateway 400 includes a user to kernel transport driver 430 (such as KNI) for the management interface. The KNI allows user space applications such as datapath daemon 225 to access kernel space applications such as the kernel network stack 425. The configuration of the gateway 400 allows the management interface applications 405-420 that use the kernel network stack 425 in the kernel space 115 to share the same NIC 150 (or the same set of NICs) with the tenant traffic of the datacenter that directly goes through the datapath daemon 225 without going through the kernel space. It should be understood that device 300 is a gateway that sends and receives datacenter tenant packet traffic from a set of tenant VMs on a set of hosts that are external to the gateway while the management interface applications 405-420 are applications in the user space of the gateway.

Figure 5:
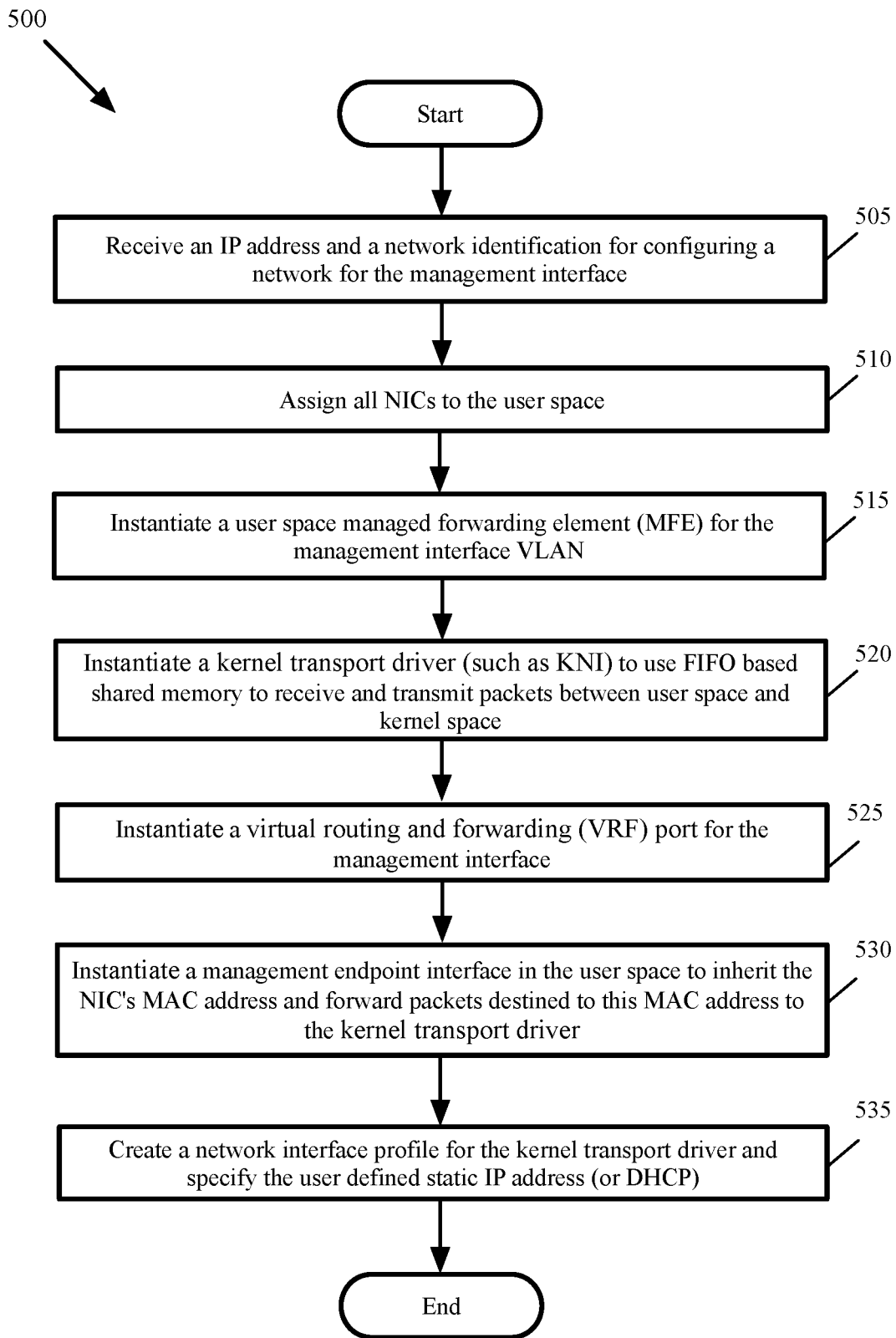
FIG. 5 conceptually illustrates a process for setting up a datapath pipeline to allow the use of the same NIC for the datapath daemon and the user space applications that require the user of the kernel network stack.

FIG. 5 conceptually illustrates a process 500 for setting up a datapath pipeline to allow the use of the same NIC for the datapath daemon and the user space applications that require the user of the kernel network stack. The process in some embodiments is performed by the gateway 400 in FIG. 4.

As shown, the process receives (at 505) an IP address and a network identification for configuring a network for the management interface. The process in some embodiments, receives the IP address and the network identification from a user (e.g., during the first boot after the datapath daemon installation) through a user interface such as the command line interface (CLI) or a graphical user interface.

The process in some embodiments receives a static IP address (or an IP address from a range of IP addresses using DHCP) and an identification of a network for the management interface. For instance, the process receives a static IP address of 10.10.10.5/24 and a virtual local area network (VLAN) of 10 for the management interface. The classless inter-domain routing (CIDR) notation 10.10.10.5/24 indicates that 24 bits of the IP address are allocated for the subnet and the remaining 8 bits are used to identify an individual interface on the subnet. It should be understood that instead of a VLAN another type of network (e.g., an overlay network) could be used for the management interface.

The process then assigns (at 510) all NICs (such as NIC 150 or any other NICs used by the gateway 400 in FIG. 4) to the user space. For instance, the process binds a DPDK driver in the user space to the NIC 150 in FIG. 4. The process instantiates (at 515) a user space managed forwarding element (MFE) for the management interface VLAN. For instance, the datapath daemon 225 in FIG. 4 uses library functions and drivers in the DPDK 220 to configure an MFE (or a logical switch) to connect the management interface VLAN.

The process also instantiates (at 515) a user space MFE for the management interface VLAN. The process also instantiates (at 520) a kernel transport driver (such as KNI) to use FIFO based shared memory to receive and transmit packets between user space and kernel space. For instance, the process instantiate user-kernel transport driver 430 in FIG. 4 and provides the user-kernel transport driver configuration (e.g., the IP address and MAC address of the KNI) to the datapath daemon 225 to use in packet forwarding.

The process also instantiates (at 525) a virtual routing and forwarding (VRF) port for the management interface. The VRF allows multiple instances of a routing table to co-exist within the same network device at the same time. Because the routing instances are independent, the same or overlapping IP addresses can be used without conflicting with each other. The process creates a port for the VRF and connects the port to the logical switch.

The process also instantiates (at 530) a management endpoint interface in user the space to inherit the NIC's media access control (MAC) address and forward packets destined to this MAC address to the kernel transport driver. For instance, the process instantiates an endpoint interface to inherit the MAC address of the NIC 150 in FIG. 4. It should be understood that a VXLAN tunnel endpoint (VTEP) may also inherit the MAC address from the NIC but there shall not be MAC conflict as the management and overlay networks are in different LANs.

The process then creates (at 535) a network interface profile for the kernel transport driver and specifies the user defined static IP address (or DHCP based IP address) for the profile. For instance, the process creates a network interface profile (e.g., in the Linux /etc/network/interfaces system file) for the KNI device and specifies static address 10.10.10.5/24 for the profile. The profile ensures that the KNI configuration is saved in the Linux system file and the static IP information or the VLAN information is not lost after a reboot. The process then ends.

Figure 6:
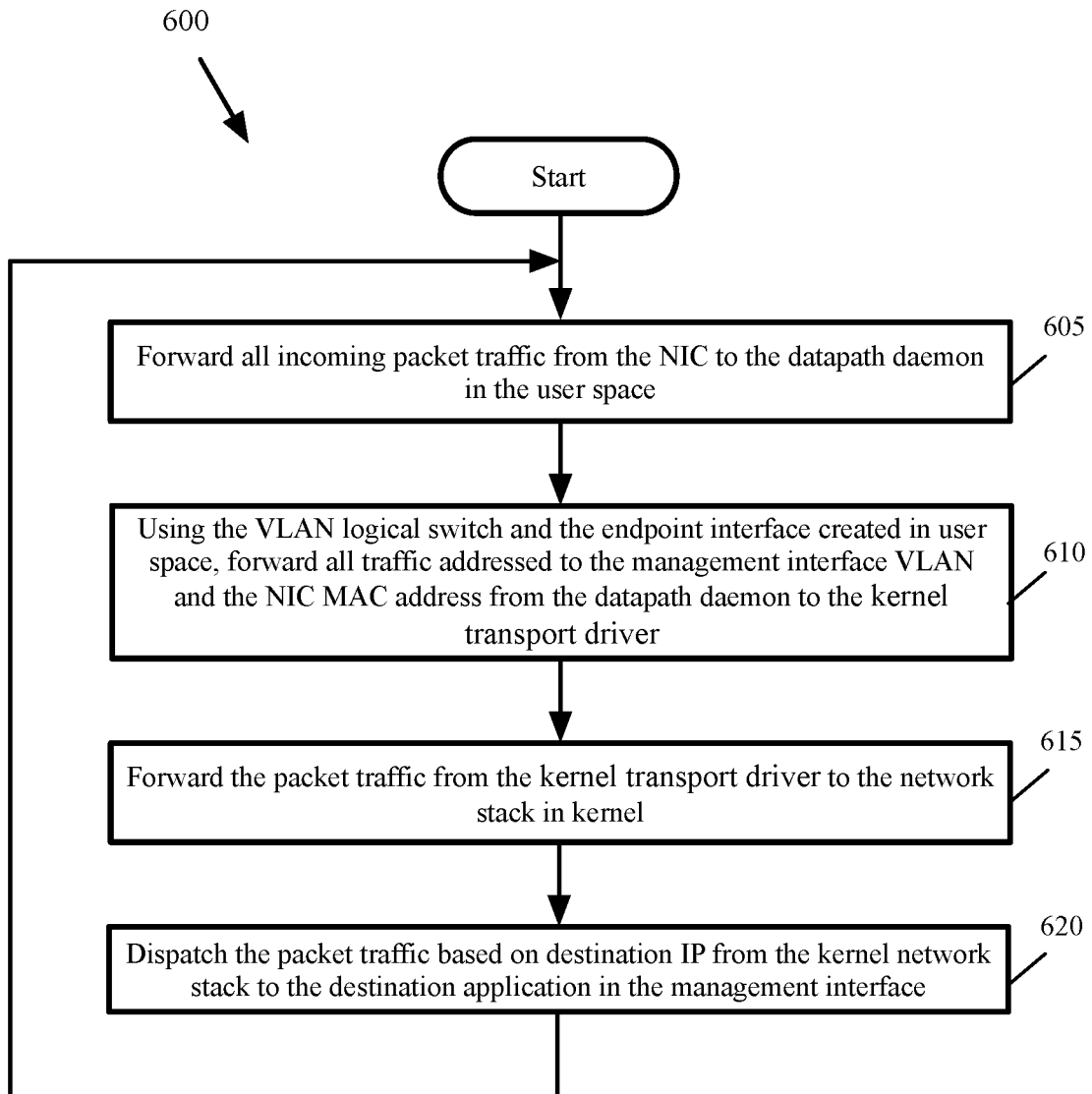
FIG. 6 conceptually illustrates a process for processing incoming packets by the pipeline of FIG. 4 in some embodiments.

FIG. 6 conceptually illustrates a process 600 for processing incoming packets by the pipeline of FIG. 4 in some embodiments. The process in some embodiments is performed by the gateway 400 in FIG. 4. As shown, the process forwards (at 605) all incoming packet traffic from the NIC to the datapath daemon in the user space. For instance, the process forwards the incoming packets that are received at the NIC 150 to the datapath daemon 225 in FIG. 4.

The process then uses (at 610) the VLAN MFE and the endpoint interface created in the user space, to forward all incoming packet traffic sent to the management interface VLAN and the NIC MAC address through the kernel transport driver to network stack in kernel. For instance, all incoming packet traffic received at the datapath daemon 225 that are addressed to the management interface VLAN (VLAN 10 in the example above) and the NIC MAC address are sent from the datapath daemon 225 to the user-kernel transport driver 430 (e.g., the KNI) of the management interface.

The process then forwards (at 615) the packet traffic from the user-kernel transport driver to the kernel network stack. For instance, the user-kernel transport driver 430 (e.g., the KNI) of the management interface (in the kernel space) sends the packets to the kernel network stack 425 (e.g., the TCP/IP stack), which is also in the kernel space.

The process then dispatches (at 620) the packet traffic based on destination IP of the packets from the kernel network stack to the destination application in the management interface. For instance, the kernel network stack 425 forwards the packets to one of the management interface applications 405-420 based on the destination IP address of the packets. The process then proceeds to 605, which was described above to continue processing the incoming packets.

Figure 7:
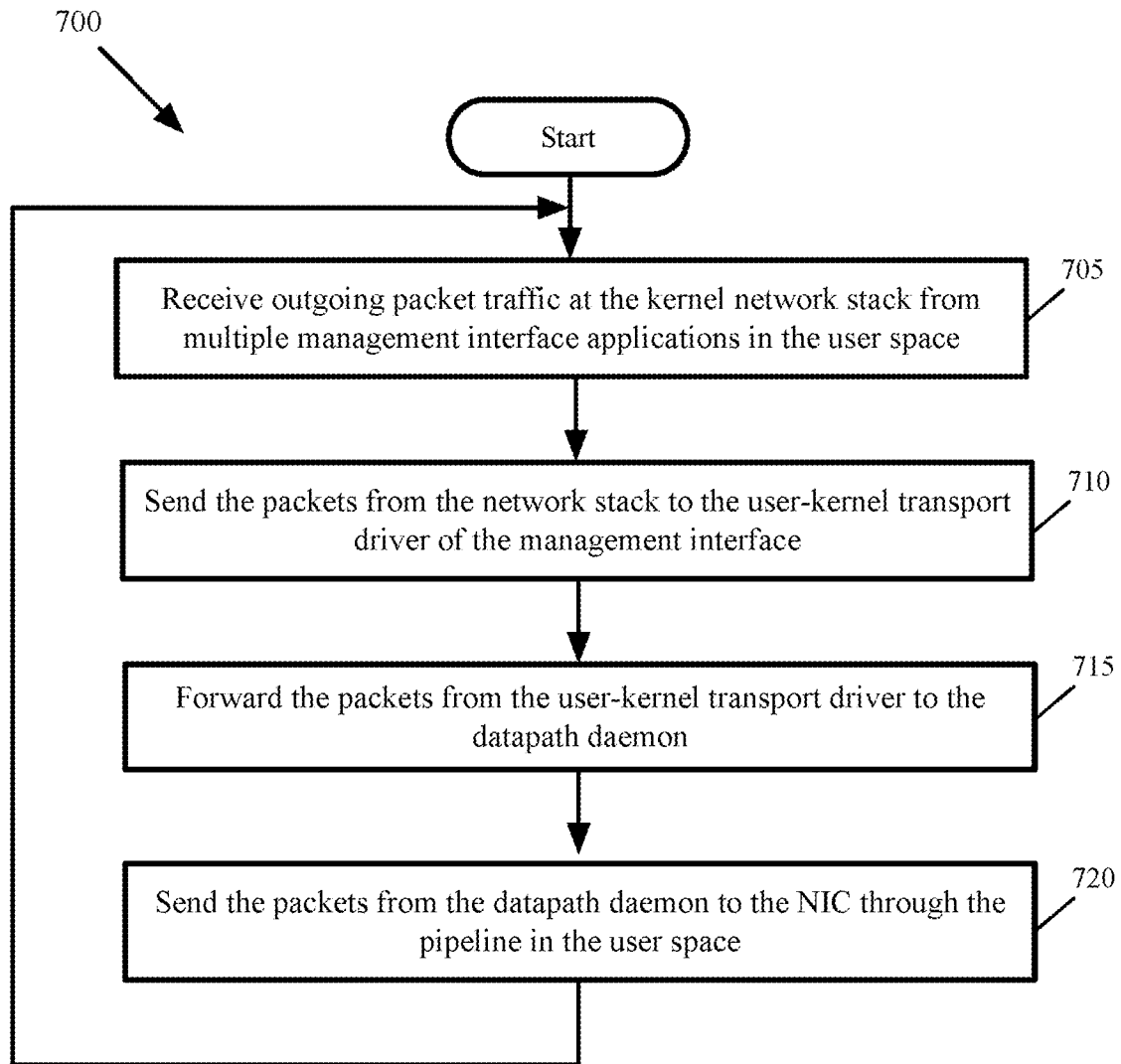
FIG. 7 conceptually illustrates a process for processing outgoing packets by the pipeline of FIG. 4 in some embodiments.

FIG. 7 conceptually illustrates a process 700 for processing outgoing packets by the pipeline of FIG. 4 in some embodiments. The process in some embodiments is performed by the gateway 400 in FIG. 4. As shown, the process receives (at 705) outgoing packet traffic at the kernel network stack from multiple management interface applications in the user space. For instance, the kernel network stack 425 (such as the TCP/IP stack) in the kernel space 115 receives outgoing packets from the management interface applications 405-420 in the user space.

The process then sends (at 710) the packets from the network stack to the user-kernel transport driver of the management interface. For instance, the process sends packets from the kernel network stack 425 to the kernel transport driver 430 in FIG. 4. The process then forwards (at 715) the packets from the user-kernel transport driver in the kernel space to the datapath daemon in the user space. For instance, the process forwards the packets from the user-kernel transport driver 430 to the datapath daemon 225.

The process then sends (at 720) the packets from the datapath daemon to the NIC through the pipeline in the user space. For instance, the process sends the packets from the datapath daemon 225 to the NIC 150 to send to the network 170. The process then proceeds to 705, which was described above to continue processing the outgoing packets.

For the processes 600 and 700, routing and address resolution protocol (ARP) learning for the management interface is done in the datapath daemon 225 in some embodiments. In other embodiments, routing and ARP learning for the management interface is done in the gateway kernel.

Figure 8:
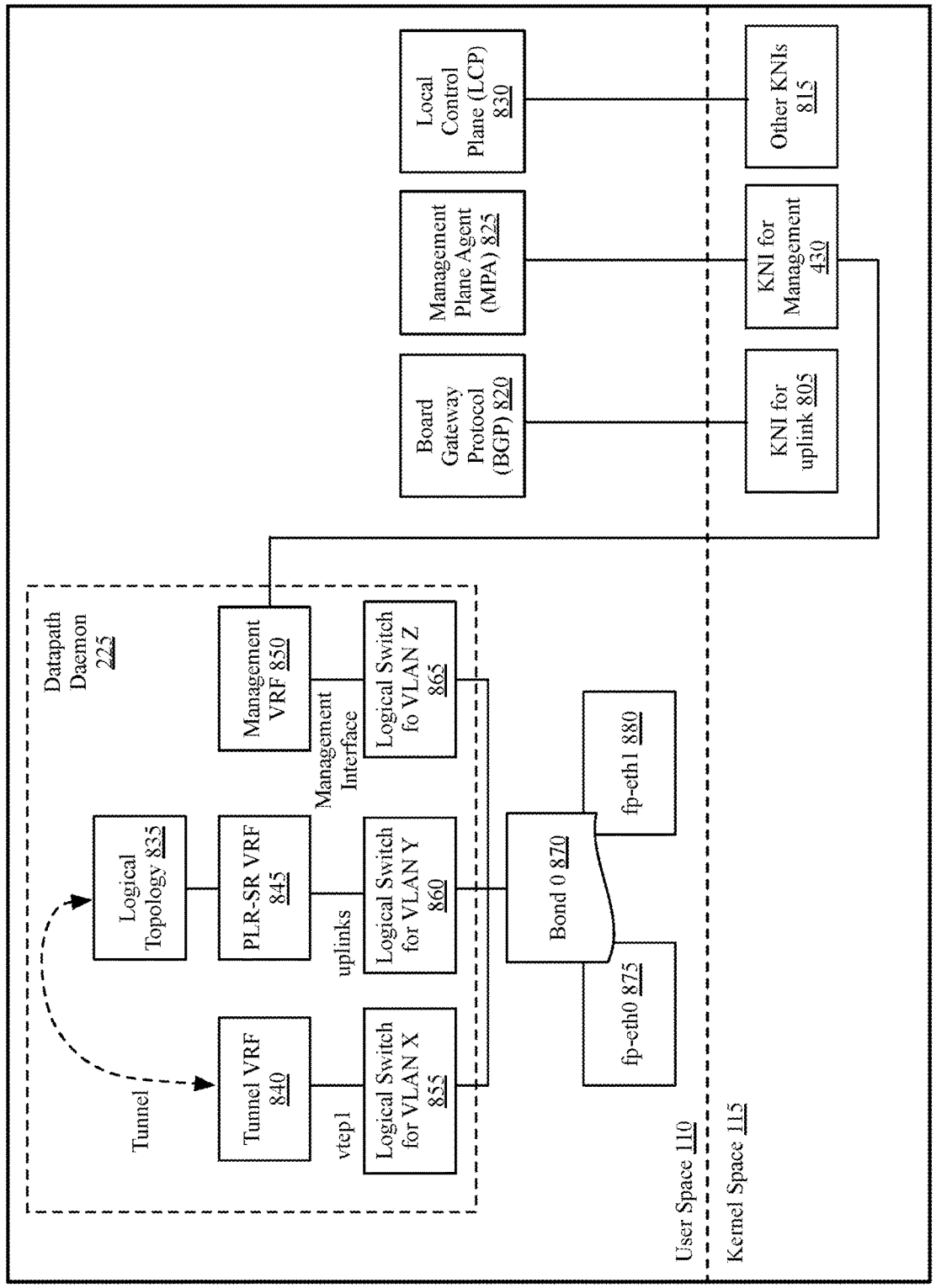
FIG. 8 conceptually illustrates an example of the datapath daemon components for in-band management interface in some embodiments.

FIG. 8 conceptually illustrates an example of the datapath daemon components for in-band management interface in some embodiments. As shown, the kernel space 115 includes several user-kernel transport drivers (in this example KNIs) including a KNI 805 for uplink to handling control plane packets (e.g., packets including route information exchange under BGP or border gateway protocol) 820, the KNI 430 for the management interface that handles packets to and from a management plane agent (MPA) 825 in the user space, and one or more other KNIs 815 for handling packets for the local control plane (LCP).

The KNI for management interface 430 sends and receives packets to/from datapath daemon 225 as described above by reference to FIGS. 4-7. As shown, the KNI for management interface 430 is connected to the management VFR 850 of the datapath daemon 225.

The datapath daemon 225 includes several MFEs (or logical switches) 855-865, several VRFs 840 and 850, a PLR-SR 845, and a logical topology 835. One of the MFEs (in this example logical switch for VLAN Z) is the MFE that was described by reference to operation 515 in FIG. 5. This logical switch is the MFE that is connected to VLAN 10 for the management interface in the example described above. Other components of the datapath daemon 225 are shown as the logical topology 835 for brevity. Further details of the datapath daemon can be found in U.S. Patent Publication 2016/0226957, entitled "Edge Datapath Using User-Kernel Transports," contents of which is hereby incorporated by reference.

As shown, multiple logical switches 855-860 share the NIC(s) with management logical switch 865. One MFE (logical switch for VLAN X 855 in this example) is used for a VTEP (step 1 in this example) to connect to a tunnel VRF 840. Another MFE (logical switch for VLAN Y 860 in this example) is used for the uplinks to connect to a point of local repair segment routing (PLR-SR) VRF 845. An uplink is a module that relays packets between an MFE (in this example logical switch for VLAN Y 860) and the NICs in order to perform various packet processing functions on incoming and outgoing traffic.

Management VRF 850, logical switch for VLAN Z 865, and KNI for management interface 430 in this example are the components that are added to the datapath 225 to support the in-band management interface and are persisted by local host. They continue to exist after host reboot.

Some embodiments support link aggregation for the management interface. As shown, the LAN Ethernet connections fp-eth0 875 and fp-eth1 880 (e.g., the connections to two NICs) form a bond (in this example bond 0 870), and the bond is connected to multiple logical switches 855-865. In this case, management interface inherits the MAC address of the bond device. The NIC configuration for other logical switches 855-860 is consistent with management interface logical switch 865 (i.e. all logical switches use bond, or all use individual NIC).

Datapath daemon 225 is implemented in the user space 110 and controls the packet pipeline to the NIC 150 in FIG. 4. If the datapath daemon 225 crashes, due to the sharing of the NIC between management interface applications 405-430 and the datapath daemon 225, the management interface applications 405-430 loses connectivity to the outside network 170. The failure remediation in some embodiments is to automatically or manually re-assign the NIC 150 to the kernel. As a result, the management interface no longer uses the datapath for network connectivity, and restore the connectivity of management interface using the kernel space as described by reference to FIG. 1. Once the connection is restored through the kernel space, the logical switch configuration for the DPDK is removed. Afterwards, the user can remotely connect into the host (e.g., by using ssh 405) to troubleshoot the problem.

Figure 9:
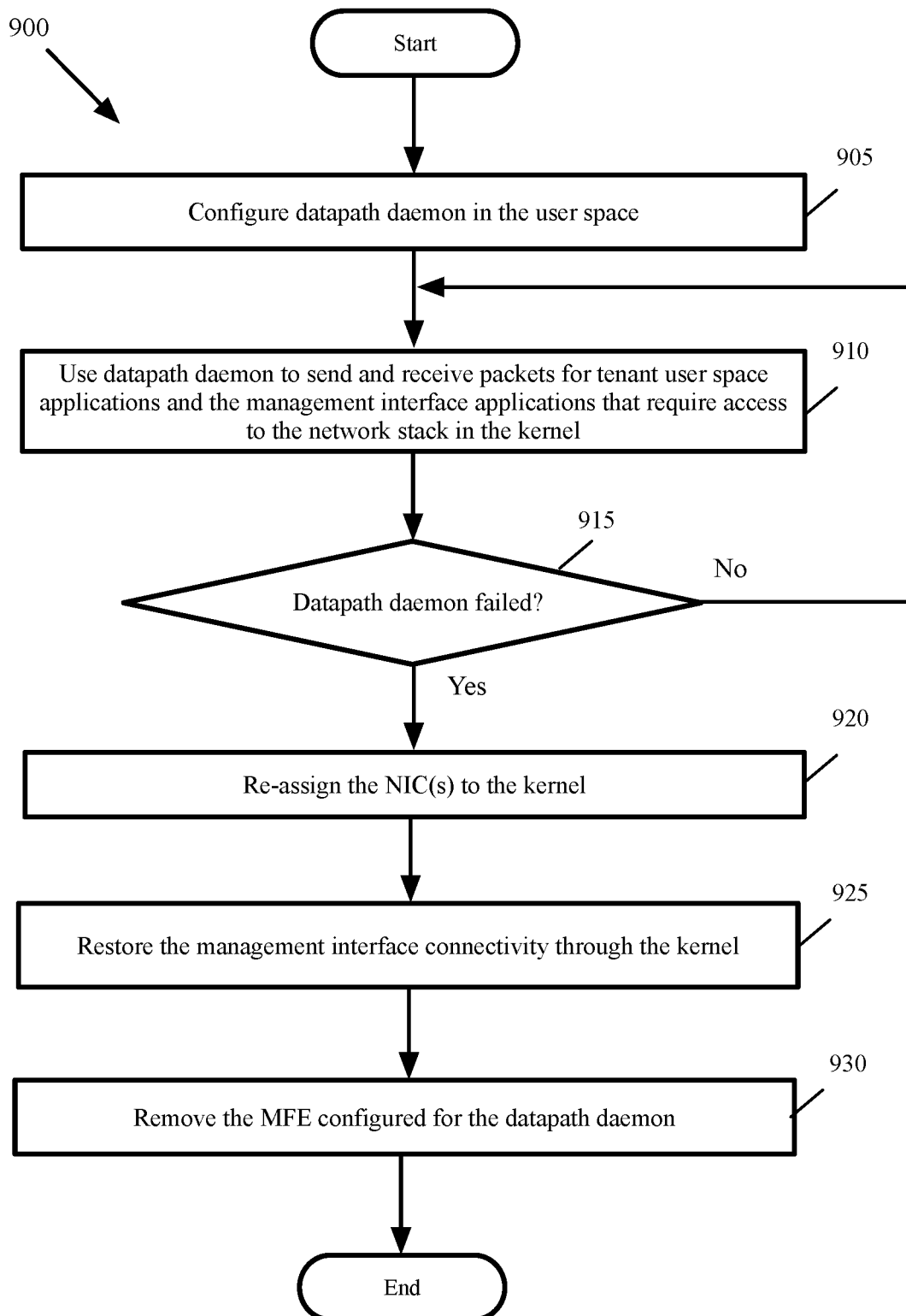
FIG. 9 conceptually illustrates a process for restoring the management interface network connectivity when the datapath daemon fails in some embodiments.

FIG. 9 conceptually illustrates a process 900 for restoring the management interface network connectivity when the datapath daemon fails in some embodiments. The process is performed either manually or automatically by a monitoring script that monitors the status of the datapath daemon in some embodiments.

As shown, the process configures (at 905) the datapath daemon in the user space. For instance, the process configures datapath daemon 225 as described above by reference to FIGS. 4-8. The process then uses (at 910) the datapath daemon (as described above) for sending and receiving packets for the user space applications including the tenant applications that use the datapath daemon directly (i.e. not going through the kernel space) and the management interface applications 405-420 that use kernel network stack 425 as described above by reference to FIGS. 4-8.

The process then determines (at 915) whether the datapath daemon has failed. For instance, the process determines whether the datapath daemon 225 in FIG. 4 has crashed. If not, the process proceeds to 910 to continue using the datapath daemon for both tenant user space applications and the management interface user space applications.

Otherwise, the process re-assigns (at 920) the NICs to the kernel. For instance, the process bonds the NIC 150 (or multiple NICs in a link aggregation group) to a NIC driver (such as driver 125 in FIG. 1) in the kernel space. The process then restores (at 925) the management interface connectivity through the kernel. For instance, the process connects management interface applications 405-420 to a kernel pipeline such as the pipeline shown in FIG. 1.

The process then removes (at 930) the MFE that was configured for the management interface. For instance, the process removes the logical switch for VLAN Z 865 in FIG. 8. The process then ends.

II. In-Band Management Interface Using Bifurcation

Figure 10:
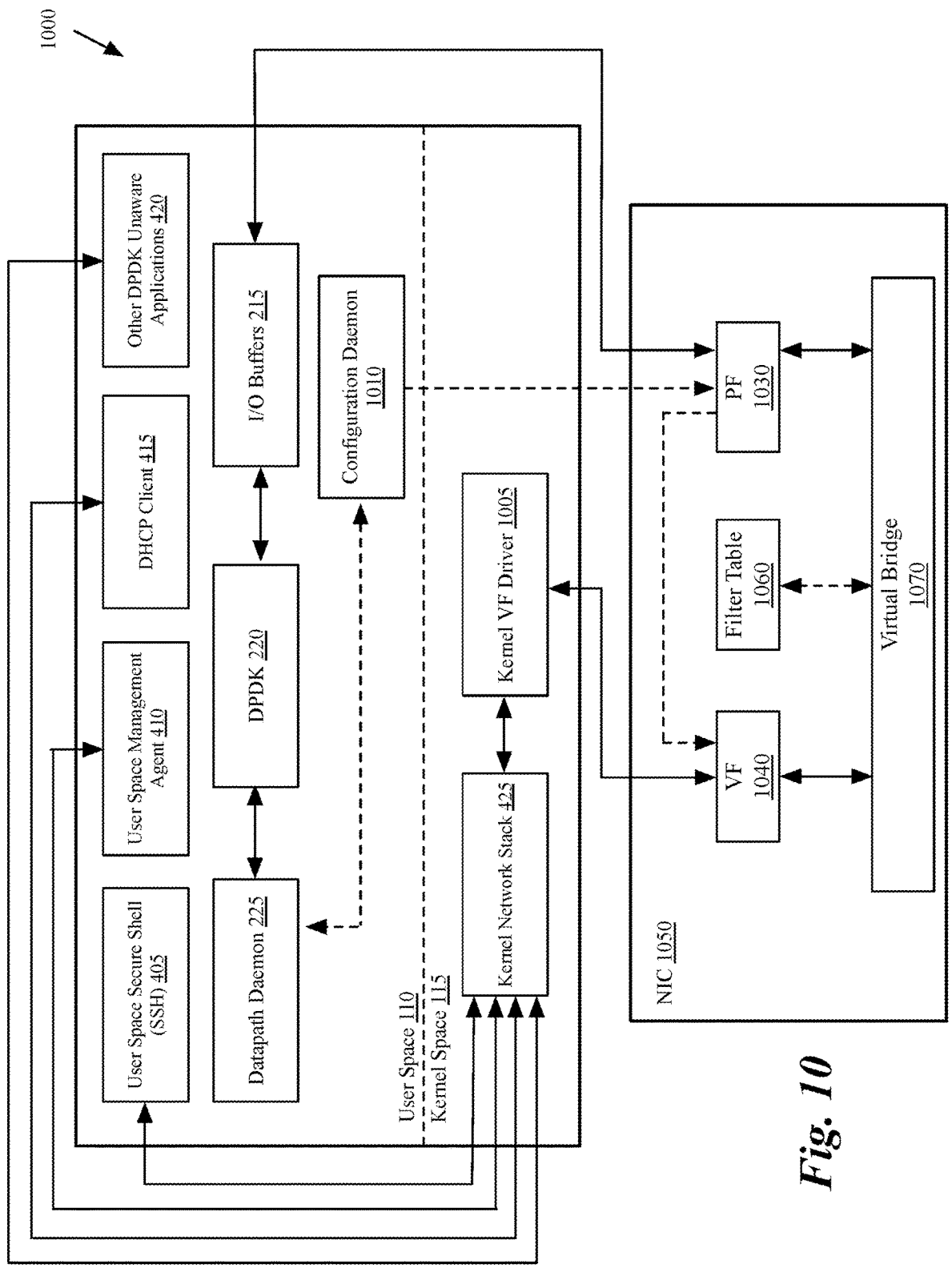
FIG. 10 conceptually illustrates a user space packet processing pipeline that uses bifurcation to share the same NIC between the management traffic and user space DPDK aware traffic in some embodiments.

Some embodiments provide in-band management interface by utilizing flow bifurcation to split traffic between the user space and kernel space. FIG. 10 conceptually illustrates a user space packet processing pipeline that uses bifurcation to share the same NIC between the management traffic and user space DPDK aware traffic in some embodiments.

As shown, the user space 110 includes the datapath pipeline that includes the datapath daemon 225, DPDK 220 libraries and drivers, and I/O buffers 215. The user space 110 also includes applications 405-420 that are not DPDK aware and cannot directly use the datapath pipeline to send and receive packets to/from the network through the NIC 150.

As shown, applications 405-420 require the use of a kernel network stack 425 (such as TCP/IP stack) to send and receive packets. Examples of these applications where given above by reference to FIG. 4.

Peripheral Component Interconnect Express (PCIe) is a high-speed serial computer expansion bus standard. Single root input/output virtualization (SR-IOV) is a specification that allows a single PCIe physical device under a single root port to appear to be multiple separate physical devices to the virtualization software or the guest operating system. SR-IOV uses physical functions (PFs) and virtual functions (VFs) to manage global functions for the SR-IOV devices.

PFs are full PCIe functions that include the SR-IOV extended capability, which is used to configure and manage the SR-IOV functionality. It is possible to configure or control PCIe devices using PFs, and the PF has full ability to move data in and out of the device. VFs are lightweight PCIe functions that contain all the resources necessary for data movement but have a minimized set of configuration resources. SR-IOV enabled PCIe devices present multiple instances of themselves to provide flow bifurcation, which is a mechanism used to split packet traffic between the user space and the kernel space.

The NIC 1050 is a hardware (or physical NIC, PNIC). As shown, the NIC includes a virtual bridge 1070, which acts as an MFE (or logical switch). The SR-IOV provides a PF 1030 and one or more VFs 1040. The PF 1030 binds to the datapath daemon 225 in the user space 110. The VF 1040 binds to a kernel VF driver 1005 in the kernel space 115.

The in-band management interface is provided by prograining filter tables 1060 on the NIC such that management interface traffic (for applications 405-420) is sent to the VF 1040 and the non-management traffic (e.g., the tenant packet traffic) is sent to PF 1030. The filter in some embodiments is based on VLAN and MAC address in order to bifurcate packet traffic between the PF 1030 and the VF 1040. The VF binds to kernel and the PF binds o the datapath daemon 225.

In an SR-IOV implementation, the PF 1030 controls majority of the resources and configuration for the VFs. Therefore, in some embodiments a configuration daemon 1010 is provided to pass the VF configuration to PF to let PF program hardware registers on behalf of VF. As shown, the configuration daemon 1010 retrieves the VF configuration from the datapath daemon 225 and passes the information to the PF 1030, allowing the PF 1030 to configure the VF 1040.

Since, the SR-IOV is a hardware-assisted feature this approach provides line rate processing capability. Unlike the user-kernel transport driver (or KNI) described above, in the SR-IOV approach is just required to enable device configuration and there is no need to take care of the packet movement during the traffic split. The SR-IOV approach can, therefore, yield better performance with less processor overhead.

Figure 11:
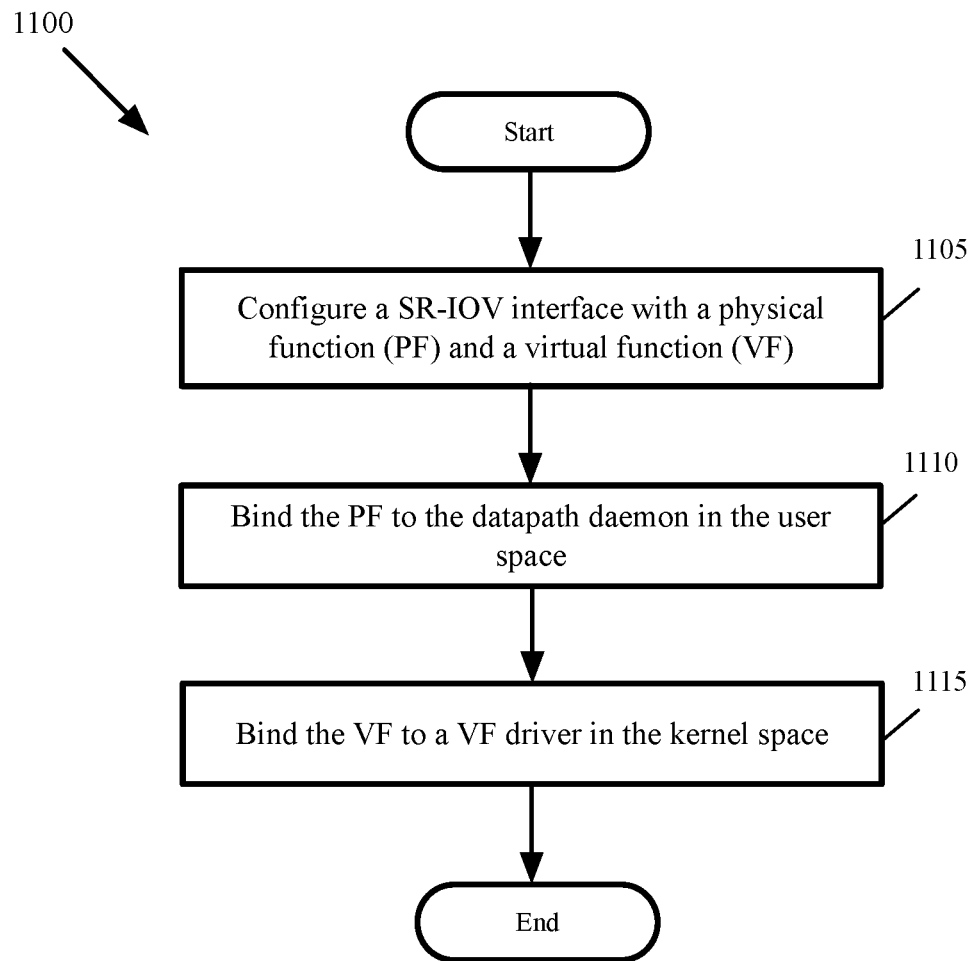
FIG. 11 conceptually illustrates a process for using flow bifurcation to configure a datapath pipeline to allow the use of the same NIC for the datapath daemon and the user space applications that require the user of the kernel network stack.

FIG. 11 conceptually illustrates a process 1100 for using flow bifurcation to configure a datapath pipeline to allow the use of the same NIC for the datapath daemon and the user space applications that require the user of the kernel network stack. The process in some embodiments is performed by the gateway 1000 in FIG. 10.

As shown, the process configures (at 1105) a SR-IOV interface with a physical function (PF) and a virtual function (VF). For instance, the process configures the virtual bridge 1070, the PF 1030, and the VF 1040 in FIG. 10.

The process then binds (at 1110) the PF to the datapath daemon in the user space. For instance, the process binds the PF 1030 to the datapath daemon 225 in FIG. 10. The process also binds (at 1115) the VF to the kernel space. For instance, the process binds the VF 1040 to a kernel VF driver 1005 in FIG. 10. The process then ends.

Figure 12:
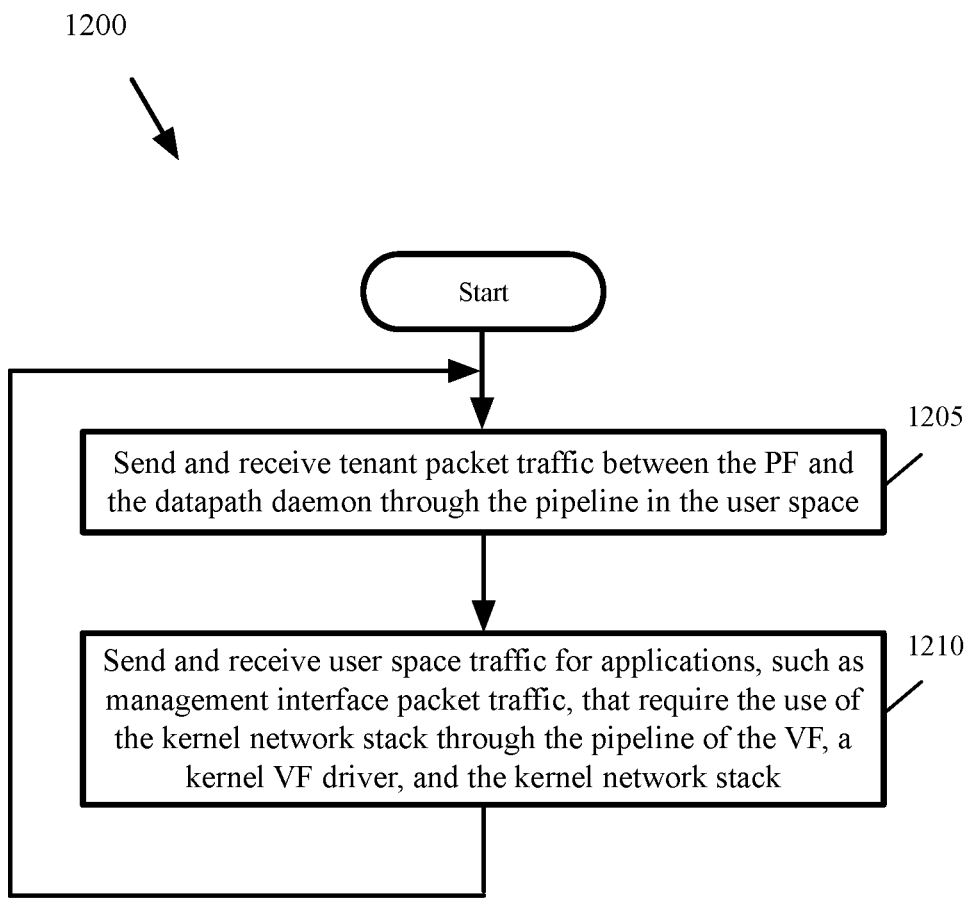
FIG. 12 conceptually illustrates a process for processing packets by the pipeline of FIG. 10 in some embodiments.

FIG. 12 conceptually illustrates a process 1200 for processing packets by the pipeline of FIG. 10 in some embodiments. The process in some embodiments is performed by the gateway 1000 in FIG. 10. As shown, the process communicates (at 1205) tenant packet traffic between the PF and the datapath daemon through the pipeline in the user space. For instance, the process exchanges packet traffic for the datacenter tenant applications through the PF 1030 to the datapath daemon 225 through the pipeline in the user space 110 (the pipeline conceptually shown between the I/O buffers 215, DPDK 220, and datapath daemon 225.

The process also communicates (at 1210) user space traffic for applications such as management interface packet traffic that require the use of the network packet stack through the pipeline of the VF, kernel VF driver, and kernel network stack. For instance, the process sends and receives packets for management interface applications 405-420 through the pipeline of VF 1040, kernel VF driver 1005, and kernel network stack 425. The process then proceeds back to 1205.

Figure 13:
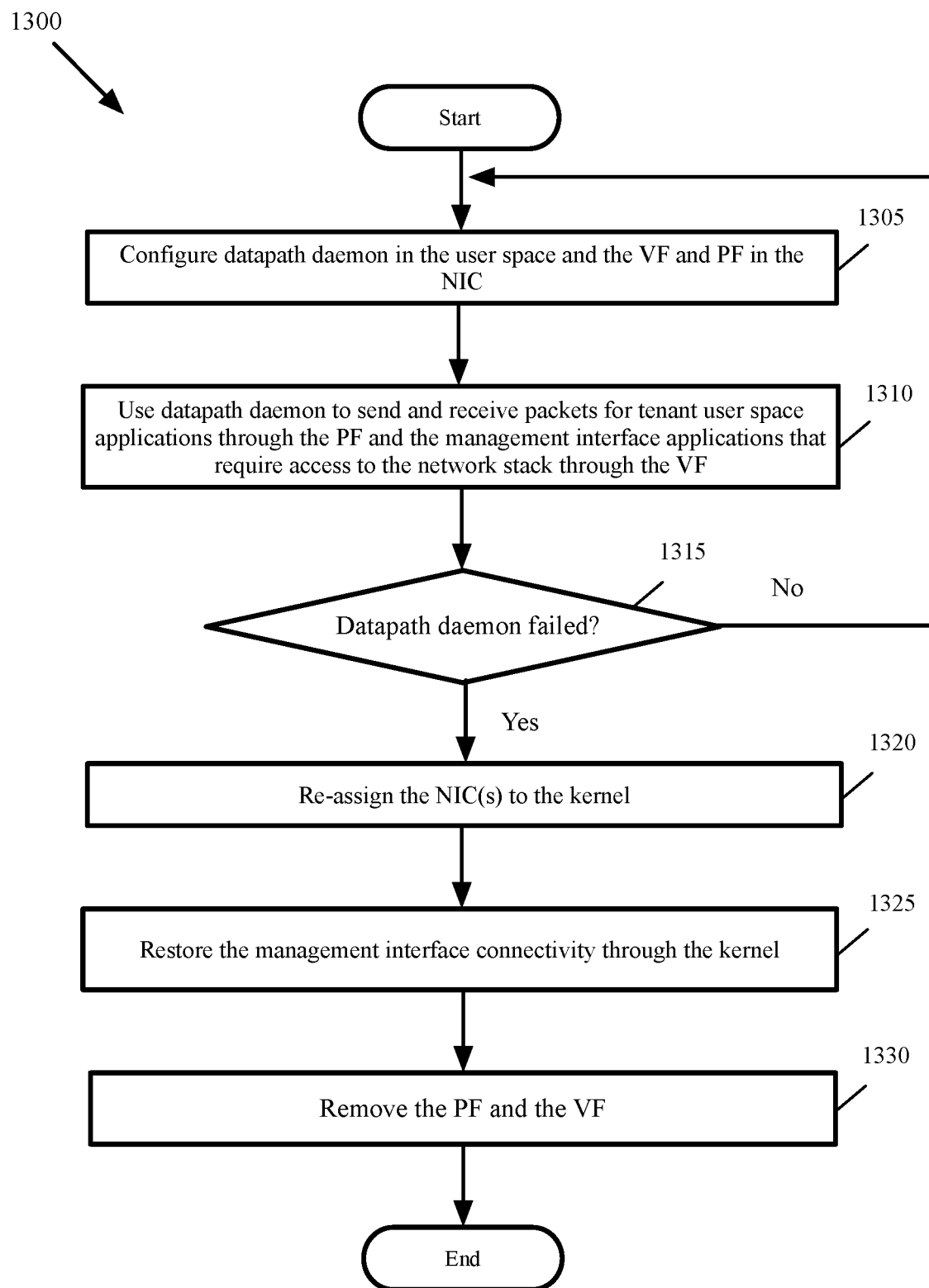
FIG. 13 conceptually illustrates a process for restoring the management interface network connectivity when the datapath daemon fails in some embodiments.

FIG. 13 conceptually illustrates a process 1300 for restoring the management interface network connectivity when the datapath daemon of FIG. 10 fails in some embodiments. The process is performed either manually or automatically by a monitoring script that monitors the status of the datapath daemon in some embodiments.

As shown, the process configures (at 1305) the datapath daemon in the user space and the VF and PF in the NIC. For instance, the process configures datapath daemon 225 as described above by reference to FIGS. 10-11. The process then uses (at 1310) the datapath daemon (as described above) to send and receive packets for tenant user space applications through the PF and the management interface applications that require access to the network stack through the VF.

The process then determines (at 1315) whether the datapath daemon has failed. For instance, the process determines whether the datapath daemon 225 in FIG. 10 has crashed. If not, the process proceeds to 1305 to continue using the datapath daemon for both tenant user space applications and the management interface user space applications.

Otherwise, the process re-assigns (at 1320) the NICs to the kernel. For instance, the process bonds the NIC 150 (or multiple NICs in a link aggregation group) to a NIC driver (such as driver 125 in FIG. 1) in the kernel space. The process then restores (at 1325) the management interface connectivity through the kernel. For instance, the process connects management interface applications 405-420 to a kernel pipeline such as the pipeline shown in FIG. 1. The process then removes (at 1330) the PF and the VF that were configured for the management interface. For instance, the process removes the PF 1030 and the VF 1040 in FIG. 10. The process then ends.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
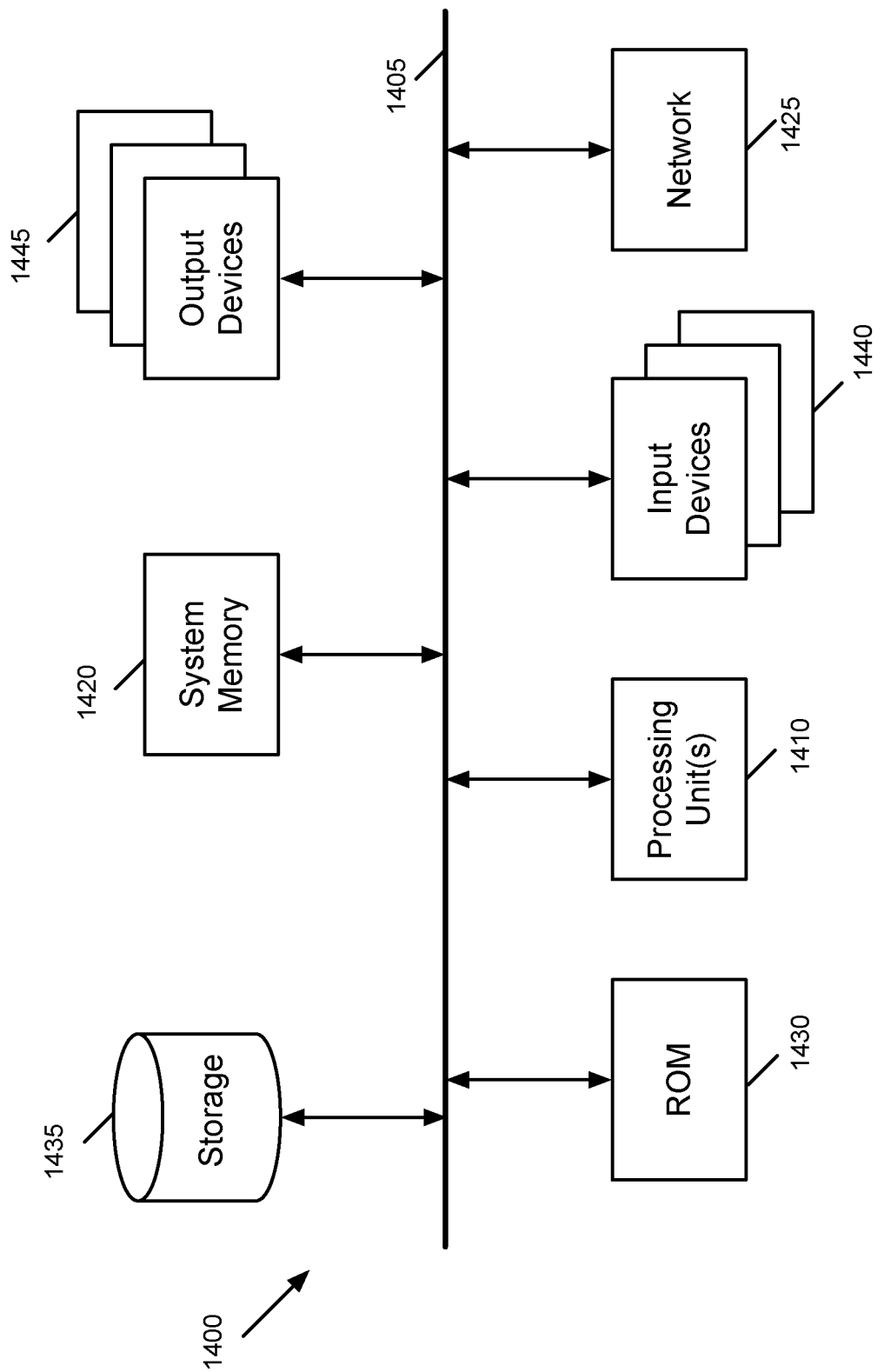
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1420, a read-only memory (ROM) 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), an Intranet, or a network of networks, such as the Internet. Any or all components of electronic system 1400 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5-7, 9, and 11-13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method for configuring a hardware network interface card (NIC) of a gateway device of a datacenter, the method comprising:
configuring at least two single root input/output virtualization (SR-IOV) interfaces on the hardware NIC;
binding a first one of the interfaces to a packet datapath executing on the gateway device, the packet datapath for processing a first set of packets sent between a set of host computers of the datacenter and devices outside the datacenter and sending the processed packets of the first set to the first interface of the hardware NIC; and
binding a second one of the interfaces to a network stack executing on the gateway device, the network stack for (i) receiving a second set of packets from a set of applications executing on the gateway device and sending the packets of the second set to the second interface of the hardware NIC and (ii) receiving a third set of packets from the second interface of the hardware NIC and sending the packets of the third set to the set of applications.

2. The method of claim 1, wherein the at least two SR-IOV interfaces comprise a physical function (PF) and at least one virtual function (VF).

3. The method of claim 2, wherein the first interface bound to the packet datapath is the PF and the second interface bound to the network stack is a VF of the at least one VF.

4. The method of claim 1, wherein at least one virtual function (VF) is bound to the network stack via a VF driver executing on the gateway device.

5. The method of claim 1, wherein (i) the packet datapath is a datapath daemon executing in a user space of the gateway device to provide routing and switching for the first set of packets and (ii) the network stack executes in a kernel space of the gateway device.

6. The method of claim 5, wherein the set of applications also execute in the user space of the gateway device.

7. The method of claim 1 further comprising configuring a set of tables of the hardware NIC to cause the hardware NIC (i) to send the first set of packets to the first interface when received at the gateway device and (ii) to send the third set of packets to the second interface.

8. The method of claim 7, wherein the set of tables comprises a set of filter tables that filter the packets based on packet addresses.

9. The method of claim 1, wherein binding the second interface to the network stack comprises passing a configuration for the second interface to the first interface for the first interface to configure the second interface.

10. The method of claim 1, wherein the set of applications comprises a management application that communicates with a network manager for the gateway device.

11. A non-transitory machine-readable medium storing a program which when executed by at least one processing unit configures a hardware network interface card (NIC) of a gateway device of a datacenter, the program comprising sets of instructions for:
configuring at least two single root input/output virtualization (SR-IOV) interfaces on the hardware NIC;
binding a first one of the interfaces to a packet datapath executing on the gateway device, the packet datapath for processing a first set of packets sent between a set of host computers of the datacenter and devices outside the datacenter and sending the processed packets of the first set to the first interface of the hardware NIC; and
binding a second one of the interfaces to a network stack executing on the gateway device, the network stack for (i) receiving a second set of packets from a set of applications executing on the gateway device and sending the packets of the second set to the second interface of the hardware NIC and (ii) receiving a third set of packets from the second interface of the hardware NIC and sending the packets of the third set to the set of applications.

12. The non-transitory machine-readable medium of claim 11, wherein the at least two SR-IOV interfaces comprise a physical function (PF) and at least one virtual function (VF).

13. The non-transitory machine-readable medium of claim 12, wherein the first interface bound to the packet datapath is the PF and the second interface bound to the network stack is a VF of the at least one VF.

14. The non-transitory machine-readable medium of claim 11, wherein at least one virtual function (VF) is bound to the network stack via a VF driver executing on the gateway device.

15. The non-transitory machine-readable medium of claim 11, wherein (i) the packet datapath is a datapath daemon executing in a user space of the gateway device to provide routing and switching for the first set of packets and (ii) the network stack executes in a kernel space of the gateway device.

16. The non-transitory machine-readable medium of claim 15, wherein the set of applications also execute in the user space of the gateway device.

17. The non-transitory machine-readable medium of claim 11, wherein the program further comprises a set of instructions for configuring a set of tables of the hardware NIC to cause the hardware NIC (i) to send the first set of packets to the first interface when received at the gateway device and (ii) to send the third set of packets to the second interface.

18. The non-transitory machine-readable medium of claim 17, wherein the set of tables comprises a set of filter tables that filter the packets based on packet addresses.

19. The non-transitory machine-readable medium of claim 11, wherein the set of instructions for binding the second interface to the network stack comprises a set of instructions for passing a configuration for the second interface to the first interface for the first interface to configure the second interface.

20. The non-transitory machine-readable medium of claim 11, wherein the set of applications comprises a management application that communicates with a network manager for the gateway device.

* * * * *